(12) United States Patent
Mehta et al.

(10) Patent No.: US 12,348,265 B2
(45) Date of Patent: Jul. 1, 2025

(54) OPTIMIZATION OF SPECTRUM SHARING IN OPTICAL LINE SYSTEMS

(71) Applicant: Ciena Corporation, Hanover, MD (US)

(72) Inventors: Priyanth Mehta, Nepean (CA); Darwin Evans, Ottawa (CA); Michael Hubbard, Ottawa (CA); Robert W. Keys, Stittsville (CA)

(73) Assignee: Ciena Corporation, Hanover, MD (US)

( * ) Notice: Subject to any disclaimer, the term of this patent is extended or adjusted under 35 U.S.C. 154(b) by 278 days.

(21) Appl. No.: 18/326,818

(22) Filed: May 31, 2023

(65) Prior Publication Data
US 2024/0259096 A1    Aug. 1, 2024

Related U.S. Application Data

(60) Provisional application No. 63/481,783, filed on Jan. 26, 2023.

(51) Int. Cl.
*H04J 14/02*  (2006.01)
*H04B 10/079* (2013.01)
*H04Q 11/00*  (2006.01)

(52) U.S. Cl.
CPC ..... *H04B 10/0795* (2013.01); *H04B 10/0799* (2013.01); *H04J 14/0265* (2013.01); *H04J 14/02762* (2023.08); *H04Q 11/0062* (2013.01); *H04Q 2011/0086* (2013.01)

(58) Field of Classification Search
None
See application file for complete search history.

(56) References Cited

U.S. PATENT DOCUMENTS

2012/0251117 A1* 10/2012 Patel ............... H04J 14/0267
398/79
2013/0084075 A1* 4/2013 Hussain ............ H04L 5/001
398/141

(Continued)

FOREIGN PATENT DOCUMENTS

EP    3 032 762 A1    6/2016

OTHER PUBLICATIONS

Hartling et al: "Subsea Open Cables: A Practical Perspective on Guidelines and Gotchas," Apr. 27, 2019, 55 pages (Year: 2019).*

(Continued)

*Primary Examiner* — Li Liu
(74) *Attorney, Agent, or Firm* — Baratta Law PLLC; Lawrence A. Baratta, Jr.

(57) ABSTRACT

Systems and methods for optimization of spectrum sharing in optical line systems include, for at least one fiber having optical spectrum being shared by at least two users in an optical line system, assigning value to the optical spectrum; determining using a policy and the assigned value of the optical spectrum how to partition the optical spectrum between the at least two users; and causing implementation of the partition of the optical spectrum. The assigned value of the optical spectrum can be based on information carrying capacity in bandwidth per second. The assigned value of the optical spectrum accounts for performance versus frequency, such that, e.g., two or more of the at least two users have different amounts of the optical spectrum from one another.

20 Claims, 16 Drawing Sheets

(56) References Cited

U.S. PATENT DOCUMENTS

| | | | |
|---|---|---|---|
| 2014/0044431 A1* | 2/2014 | Hussain | H04J 14/0263 398/79 |
| 2014/0205296 A1* | 7/2014 | Dahlfort | H04Q 11/02 398/79 |
| 2014/0212135 A1* | 7/2014 | Ji | H04L 49/356 398/51 |
| 2016/0164597 A1* | 6/2016 | Evans | H04B 10/564 398/9 |
| 2018/0295429 A1* | 10/2018 | Swinkels | H04Q 11/0005 |
| 2018/0359029 A1* | 12/2018 | Shiner | H04B 10/0795 |

OTHER PUBLICATIONS

Kaeval et al: "Characterization of the optical spectrum as a service," Journal of Optical Communications and Networking, vol. 14, No. 5, May 2022, pp. 398-410 (Year: 2022).*

K. Kaeval et al., "Characterization of the optical spectrum as a service," Journal of Optical Communications and Networking, vol. 14, No. 5, May 2022, pp. 398-410.

E. Rivera Hartling et al., "Subsea Open Cables: A Practical Perspective on Guidelines and Gotchas," Apr. 27, 2019, 55 pages.

May 27, 2024, International Search Report and Written Opinion for International Patent Application No. PCT/US2024/012855.

ITU-T, Telecommunication Standardization Sector of ITU, "Transverse compatible dense wavelength division multiplexing applications for repeatered optical fibre submarine cable systems," Series G: Transmission Systems and Media, Digital Systems and Networks, G.977.1, Oct. 2020, 30 pages.

C. E. Shannon, "A Mathematical Theory of Communication," vol. 27, pp. 379-423, 623-656, Jul., Oct. 1948, 55 pages.

\* cited by examiner

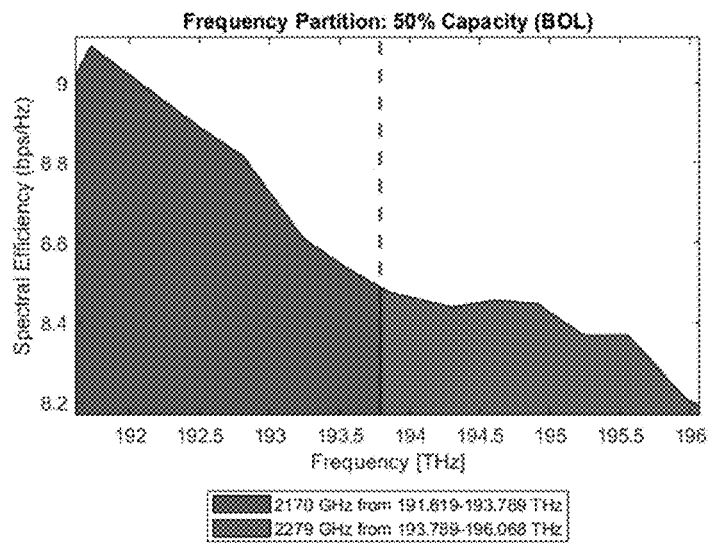
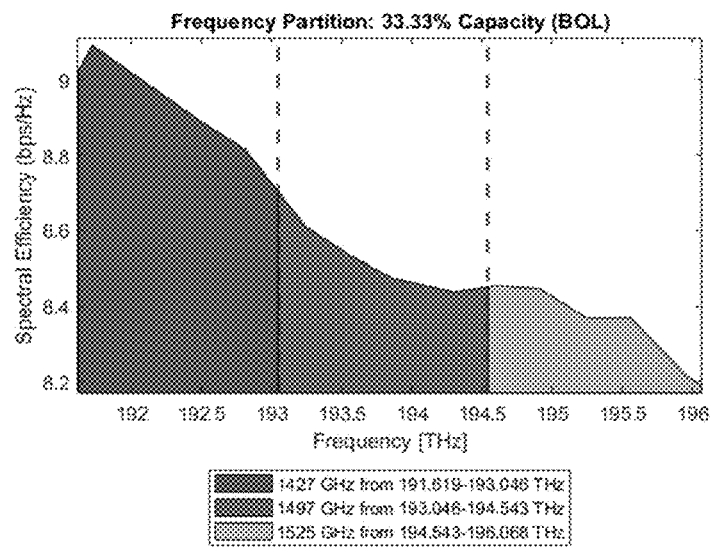
*FIG. 9*
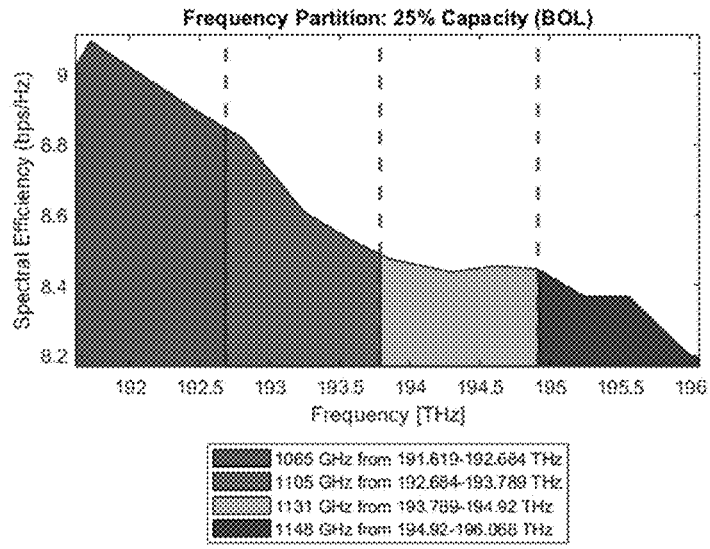

OPTIMIZATION OF SPECTRUM SHARING IN OPTICAL LINE SYSTEMS

CROSS-REFERENCE TO RELATED APPLICATION(S)

The present disclosure claims priority to U.S. Provisional Patent Application No. 63/481,783, filed Jan. 26, 2023, the contents of which are incorporated by reference in their entirety.

FIELD OF THE DISCLOSURE

The present disclosure relates generally to fiber optics. More particularly, the present disclosure relates to systems and methods for optimization of spectrum sharing in optical line systems.

BACKGROUND OF THE DISCLOSURE

Spectrum sharing is an evolving business model. Sharing the capacity of an optical cable among two or more users can occur either via a sale of the spectrum or a co-purchase of a fiber pair. At face value, it appears very straightforward—divide the usable optical bandwidth into spectral slices and operate each slice as a virtual fiber pair. However, not all spectrum is equal and the operational realities of buying and selling spectrum (in GHz) versus capacity (in Gb/s) are not widely understood. Spectrum sharing is common in submarine cable systems which are very expensive to build and operate. Of note, fiber cables underneath the sea exhibit significant changes over time due to fiber aging (e.g., under the water, hydrogen can go through the casing over time creating additional loss and that loss may be different across the spectrum), waves can move the cable over time causing disruptions, repeater aging can reduce performance and it is very costly to simply replace repeaters, and the like. Thus, in an example sharing of a fiber pair between two users, a simple split may be equitable up front, but this can change.

BRIEF SUMMARY OF THE DISCLOSURE

The present disclosure relates to systems and methods for optimization of spectrum sharing in optical line systems. The present disclosure includes techniques for assigning value to spectrum in a spectrum sharing environment and explore how variations in SNR over frequency and time impact such valuations. We then use a representative spectrum to illustrate allocating spectrum between users using equal capacity. Finally, we discuss the role of terminal technologies and automation in spectrum sharing applications. Specifically, we discuss and clarify the operational complexities of spectrum sharing. We start by exploring the valuation of spectrum, and how this valuation may change over time. We then use an example of a measured SNR (signal to noise ratio) profile to demonstrate different options for spectral allocation. Next, we discuss how SLTE (Submarine Line Terminating Equipment) technologies can impact spectrum sharing decisions, and finally we look at the role of automation and instrumentation in spectrum sharing. Of note, while the optimization of spectrum sharing is described with respect to submarine systems, those skilled in the art will recognize they can be applied equally to terrestrial systems or any other type of fiber optic system where the spectrum is shared.

Conventional spectrum sharing approaches leverage either transmit power equalization or end-to-end average power equalization, to contain users in a fixed partition. Disadvantageously this produces sub-optimal results and requires intervention at every cable system event (e.g., capacity change, fiber cut, etc.). Thus, performance and operation dynamics for each partner (user) are severely hampered by currently known static configurations. The value of the system and value to the partner degrades with time. That said, the present disclosure attempts to 'refresh' the performance.

In particular, the present disclosure describes optical control policies for spectrum sharing or spectrum leasing and the management system for monitoring, alarming, and enforcing each policy. We describe the coverage for policies, and implementation method(s) of the spectrum sharing management controller at both the data plane and control plane.

In various embodiments, the present disclosure includes a method having steps, a processing device, such as a management system, configured to implement the steps, and a non-transitory computer-readable medium storing instructions that, when executed, cause one or more processors to perform the steps. The steps include, for at least one fiber having optical spectrum being shared by at least two users in an optical line system, assigning value to the optical spectrum; determining using a policy and the assigned value of the optical spectrum how to partition the optical spectrum between the at least two users; and causing implementation of the partition of the optical spectrum.

The assigned value of the optical spectrum can be based on information carrying capacity in bandwidth per second. The assigned value of the optical spectrum accounts for performance versus frequency, such that two or more of the at least two users have different amounts of the optical spectrum from one another. The partition of the optical spectrum can be contiguous such that each of the at least two users has a contiguous amount of the optical spectrum. The partition of the optical spectrum can be fragmented between each of the at least two users.

The determining and the implementation can be performed at system turnup of the optical line system. The determining and the implementation can be performed subsequent to system turnup and after a period of operation of the optical line system, where there has been any of performance degradation of the optical line system and system enhancement of the optical line system. The steps can further include monitoring the optical line system; and checking the partition of the optical spectrum with the policy to determine whether there is violation of the policy due to any of performance degradation of the optical line system and system enhancement of the optical line system.

The policy can include one of allocation of spectral bands for the at least two users such that each band equally fits a highest baud channel at an arbitrary line rate, allocation of the spectral bands for the at least two users such that each band equally fits a same channel count of line rates, and allocation of the spectral bands for the at least two users that equally contain a same maximum theoretical capacity based on integration of frequency-dependent optical performance.

BRIEF DESCRIPTION OF THE DRAWINGS

The present disclosure is illustrated and described herein with reference to the various drawings, in which like reference numbers are used to denote like system components/method steps, as appropriate, and in which:

FIG. 9 is graphs of equal Shannon capacity distribution at BOL for 2, 3, and 4 spectral partitions.

DETAILED DESCRIPTION OF THE DISCLOSURE

Again, the present disclosure relates to systems and methods for optimization of spectrum sharing in optical line systems. The present disclosure includes techniques for assigning value to spectrum in a spectrum sharing environment and explore how variations in SNR over frequency and time impact such valuations. We then use a representative spectrum to illustrate allocating spectrum between users using equal capacity. Finally, we discuss the role of terminal technologies and automation in spectrum sharing applications. Specifically, we discuss and clarify the operational complexities of spectrum sharing. We start by exploring the valuation of spectrum, and how this valuation may change over time. We then use an example of a measured SNR (signal to noise ratio) profile to demonstrate different options for spectral allocation. Next, we discuss how SLTE (Submarine Line Terminating Equipment) technologies can impact spectrum sharing decisions, and finally we look at the role of automation and instrumentation in spectrum sharing.

The present disclosure includes:

(1) An approach that formulates the ability to highly customize a shared network configuration based on several objectives, where each objective forms an operating policy.

(2) The approach is not subject to the variabilities and uncertainties associated with nonlinear optical effects as the Power Spectral Density (PSD) and optical loading is kept constant throughout its operation.

(3) Methodologies that are not limited to network elements and their performance. A single external controller actively accommodates the enhancements or deficiencies of the partner terminal.

(4) No knowledge of any or all intermediate components in the system are required to develop the policies and partitioning rules for capacity equality across partners.

Spectrum Sharing

Figure 1:
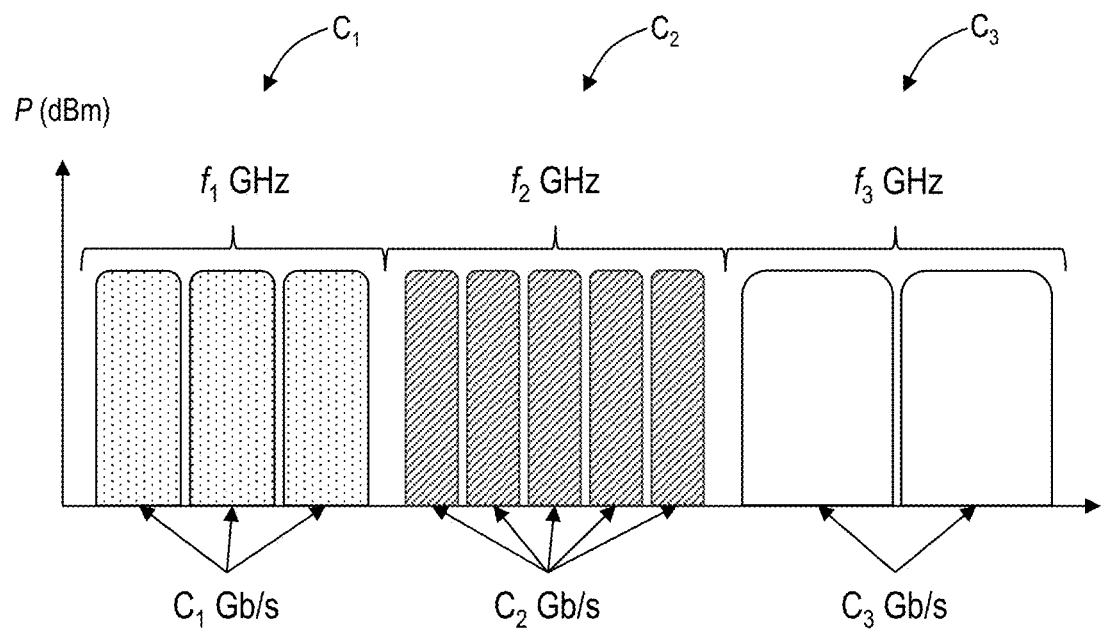
FIG. 1 is a graph of optical spectrum illustrating contiguous spectrum sharing allocation between three users.
Figure 2:
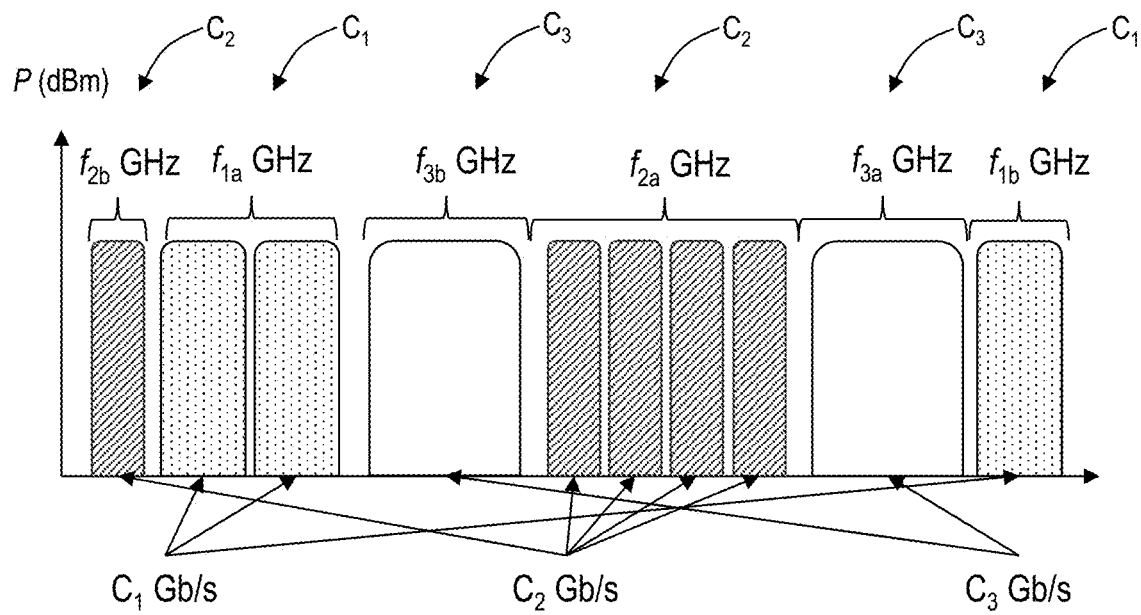
FIG. 2 is a graph of optical spectrum illustrating fragmented spectrum sharing allocation between the three users.

FIG. 1 is a graph of optical spectrum illustrating contiguous spectrum sharing allocation between three users C1, C2, C3. FIG. 2 is a graph of optical spectrum illustrating fragmented spectrum sharing allocation between the three users C1, C2, C3. The present disclosure relates to systems and methods for optimization of spectrum sharing channel configurations and management of the individually leased spectral partitions in an optical line system. Spectrum sharing and/or leasing have become popular business models for terrestrial and submarine line system operators. For example, submarine line systems typically have significant costs, including high installation costs. As such, various service providers typically form consortiums to build and manage a submarine line system, where each service provider is allocated some portion of the submarine line system.

In this model, an operator or manager is responsible for the management of the line system and ensuring allocated spectra follow one or more control policies. Allocated spectra may exist in contiguous or fragmented bandwidths within the traffic carrying passband. A contiguous implementation is shown in FIG. 1 where C1, C2, C3 represent the three (as an example) independent customers/partners (service providers). A fragmented implementation is shown in FIG. 2 where each partner is allocated spectrum per availability and/or preferred spectral regions.

Spectrum Valuation

The technology required to facilitate spectrum sharing leverages multiplexing/demultiplexing technologies such as wavelength selective switches (WSS) and optical channel monitors (OCMs). In a submarine line system, the terminals are referred to as Submarine Line Terminating Equipment (SLTEs), and, in terrestrial line systems, the terminals are referred to as Reconfigurable Optical Add/Drop Multiplexers (ROADMs). These network elements include various components for multiplexing/demultiplexing spectrum on an optical fiber. Those skilled in the art will recognize that while the following descriptions referred to submarine line systems, submarine networks, etc. the present disclosure contemplates implementation with any type of optical line system including terrestrial line systems. However, the commercial side of spectrum sharing is not as mature and lacks widely accepted, standardized definitions for many important aspects. One such aspect is the valuation of spectrum, such as for fairly allocating spectrum amongst multiple providers.

Traditionally, capacity (measured in bits/seconds (b/s)) has been the primary technical metric used to define the commercial value of spectrum. Buying and selling capacity is not new, and the industry has developed techniques for specifying and valuing capacity commitments in commercial contracts.

In contrast, spectrum sharing is focused on the division of spectral resources (measured in GHz) on an optical fiber. This construct can be very useful because it separates the performance, and thus value, of a wet plant (optical line system with amplifiers, repeaters, branching units, etc.) from any specific terminal technology (i.e., terminal equipment such as modems). While this aligns with the industry direction of embracing an open cable paradigm, it is a departure from the traditional approach of directly dealing in terms of capacity.

Spectrum Versus Capacity

This leads us to the important question of how can we value spectrum? While the focus in spectrum sharing applications is on spectrum (GHz), relating this to the information carrying capacity (Gb/s) allows us to leverage existing capacity valuation paradigms.

SNR is a key factor in determining the fundamental limit in information carrying capacity for a given communications channel. Specifically, the well-known Shannon-Hartley theorem provides the relationship between the SNR of a dual-polarization channel (linear units), its bandwidth (B, in Hz), and the theoretical limit of the capacity (C, in b/s) (see C. E. Shannon, "A mathematical theory of communication," in The Bell System Technical Journal, vol. 27, no. 3, pp. 379-423, July 1948, doi: 10.1002/j.1538-7305.1948.tb01338.x.):

$$C = 2B \cdot \log_2(1 + SNR) \quad (1)$$

However, the total SNR of a communication system includes both the channel and the terminal components (i.e., both cable and SLTE in a submarine case). This does not align well with an open cable paradigm nor with valuing the performance of the submarine cable on its own. Thus, we propose using GSNR (Generalized Signal to Noise Ratio) for the valuation of the cable itself. GSNR includes both the linear and non-linear noise terms from the wet plant (Telecommunication Standardization Sector of ITU, "Recommendation ITU-T G.977.1 Transverse compatible dense wavelength division multiplexing applications for repeated optical fibre submarine cable systems" (2020)). In addition, it is common to assume a minimum amount of margin must always be available, and this can be accounted for in the capacity formula by adding a term "M" (linear units):

$$C_{Limit} = 2B \cdot \log_2\left(1 + \frac{GSNR}{M}\right) \quad (2)$$

Equation (2) gives us the relationship between what we can characterize on a given cable (GSNR over bandwidth B) and an upper limit on capacity if we were to have an ideal modem with margin M. This is a useful metric for the valuation of spectrum because it is wholly independent of SLTE technology. However, it must be recognized that commercial SLTE technologies cannot achieve this ultimate capacity defined by Equation (1) in practice, and the difference between this upper bound and a deployable solution can be quite large.

One option for reducing the gap between the predicted Shannon capacity and the commercially achievable capacity is to use a margin of 3 dB (M=2) in Equation (2). This will not provide a precise alignment for all technologies but provides a general guideline for state-of-the-art coherent modems available today.

Dependence on Frequency

It is important to note that not all spectrum is equal. Submarine cables are large, complex, analog devices, and acknowledging variations in performance vs. frequency is not new. For spectrum sharing, the main consequence of this is that the GSNR will vary with frequency, and thus the ultimate capacity will also vary with frequency. As a result, the capacity for a given portion of spectrum between $f_1$ and $f_2$ with bandwidth B, whose SNR varies as SNR(f) is given by:

$$C_B = \int_{f_1}^{f_2} \log_2\left(1 + \frac{GSNR(f)}{M}\right) df \quad (3)$$

However, it is typically not possible to analytically define GSNR(f), nor to analytically evaluate this integral. Thus, a practical approach is to approximate this integral by quantizing the spectrum into n chunks and summing these together—i.e., approximating with a Riemann sum:

$$C_B \approx \sum_{i=1}^{n} C_i, \text{ where} \quad (4)$$
$$C_i = 2B \cdot \log_2\left(1 + \frac{GSNR_i}{M}\right)$$

Figure 3:
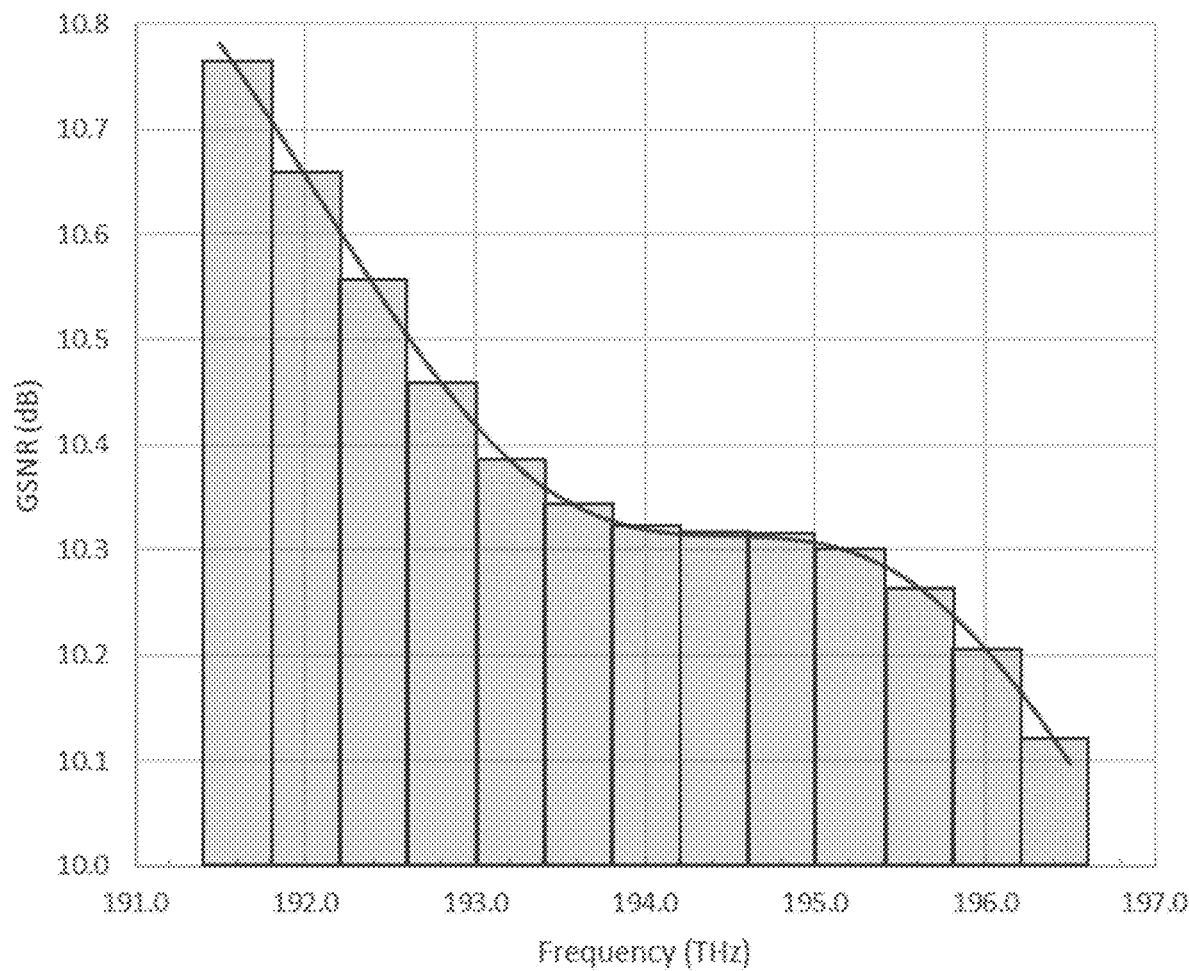
FIG. 3 is a graph of a Riemann approximation of Generalized Signal to Noise Ratio (GSNR) across optical spectrum.

This is illustrated in FIG. 3 which is a graph of a Riemann approximation of Generalized Signal to Noise Ratio (GSNR) across optical spectrum, and it is well known that this approximation improves with larger values of n, and equals the integral as $B_i$ approaches zero.

Evolution Over Time

Figure 4:
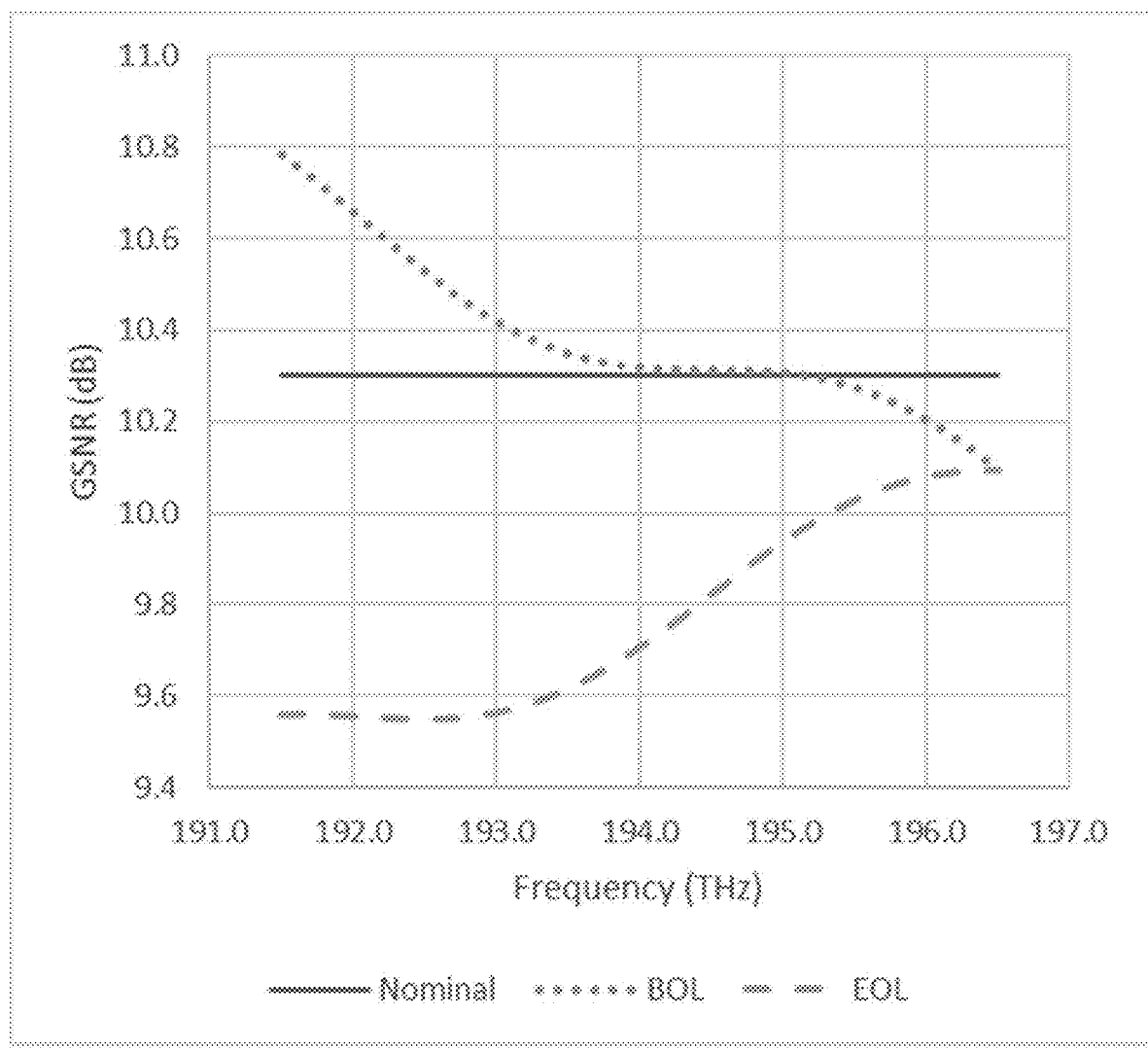
FIG. 4 is a graph of example GSNR variations over time.

In addition to GSNR varying with frequency, one must also consider how GSNR(f) may vary over time. For example, at the design stage of a cable build, you may only have access to nominal and/or worst case GSNR values, without any detail on the spectral dependence. However, at cable acceptance, this could change with a spectrum sweep which measures the beginning of life (BOL) GSNR(f). Finally, as the cable ages, the end of life (EOL) GSNR(f) can change due to repairs and other factors. This is illustrated in FIG. 4 which is a graph of example GSNR variations over time.

From this example, we can see that not only does the average GSNR of a cable potentially change with time, the variation of GSNR for a specific portion of the spectrum can vary more than this average.

This presents a challenge to both the buyer and seller when it comes to assigning a valuation to a particular piece of spectrum at a given point in time. Specifically, while a Shannon capacity can be assigned given a GSNR and margin, the buyer and seller should agree on what that means in terms of guaranteed future GSNR(f) for the spectrum in question to account for both the present and future value of the asset.

Spectrum Sharing Optimization Example

We propose a framework for spectrum valuation using Shannon Capacity determined using GSNR(f) and a Riemann Sum approximation. In this section, we will use example BOL and EOL spectra to illustrate this process, and to demonstrate different options for partitioning spectrum.

Figure 5:
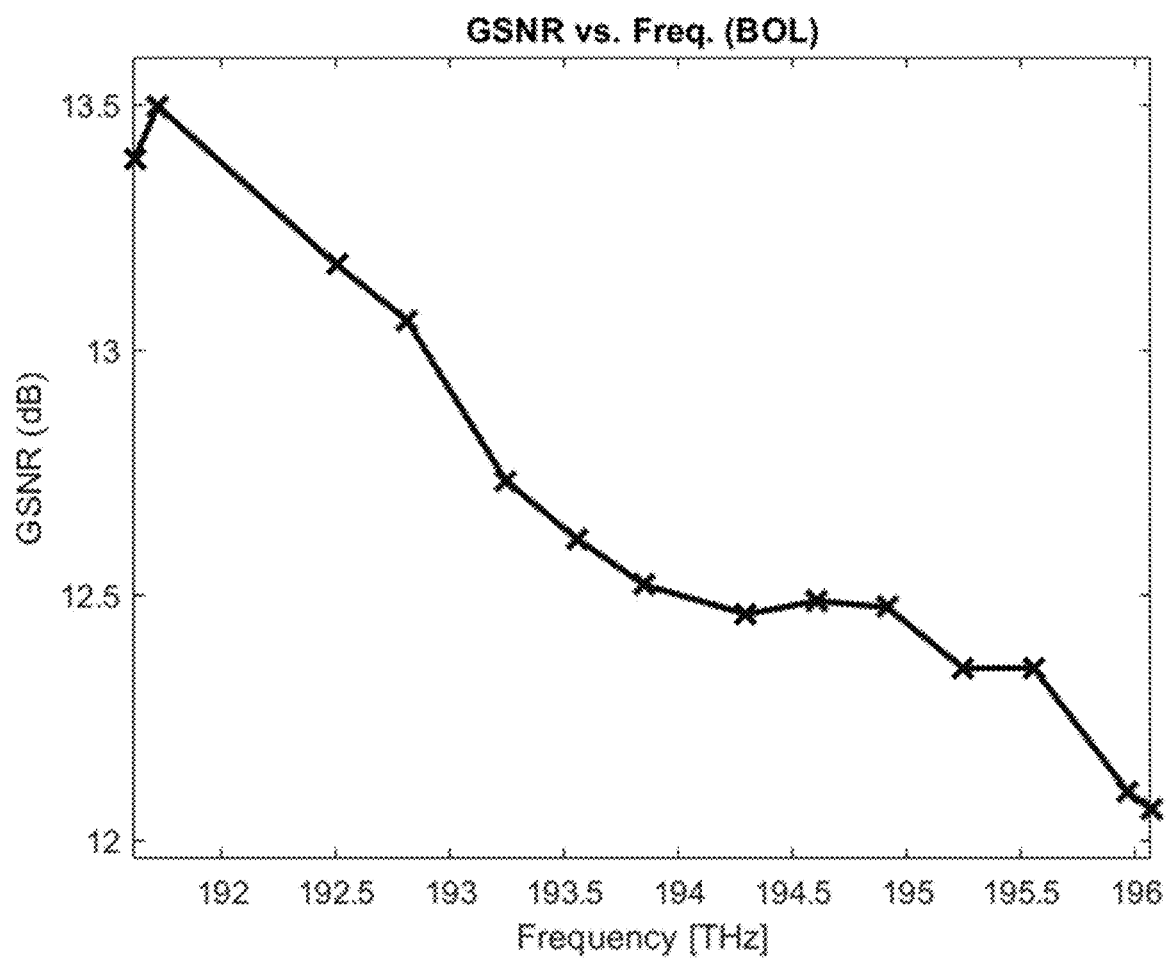
FIG. 5 is a graph of Beginning of Life (BOL) GSNR versus frequency (GSNR(f)) for a modern, trans-Atlantic, uncompensated fiber pair.

FIG. 5 shows a representative BOL GSNR versus frequency for a modern, trans-Atlantic, uncompensated fiber pair.

Figure 6:
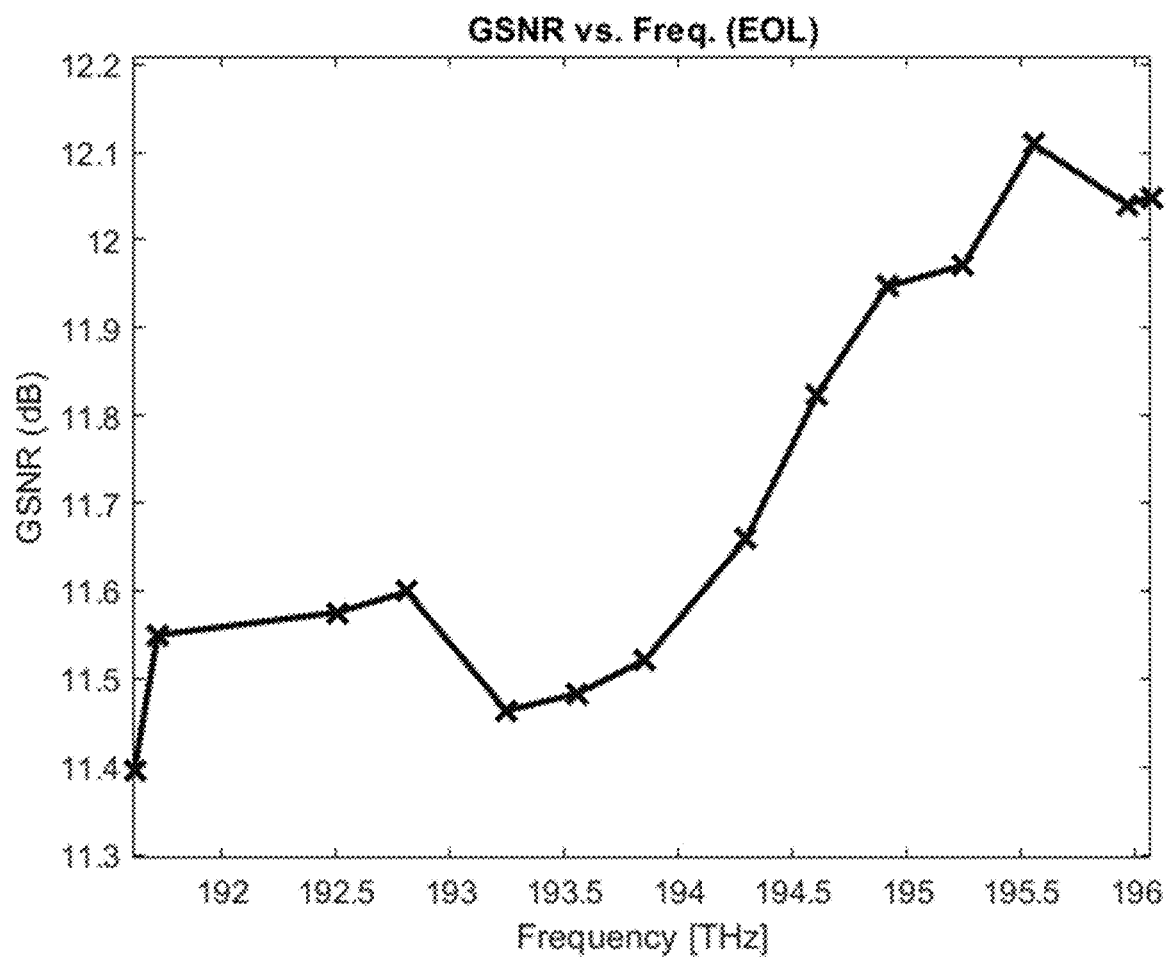
FIG. 6 is a graph of a predicted End of Life (EOL) GSNR(f) for this same fiber pair.

As an illustrative example, FIG. 6 shows a predicted EOL GSNR(f) for this same fiber pair. In this case it has been assumed that cable aging and repairs have impacted both the average GSNR and the tilt.

With these GSNR(f) curves, we can partition the spectrum and calculate the local Shannon capacity estimate using Equation (4). If we then divide by the width of the spectrum used ($B_i$) we can calculate the local Shannon spectral efficiency (S.E., in b/s/Hz) as:

$$S.E. = C_B/B_i \qquad (5)$$

Figure 7:
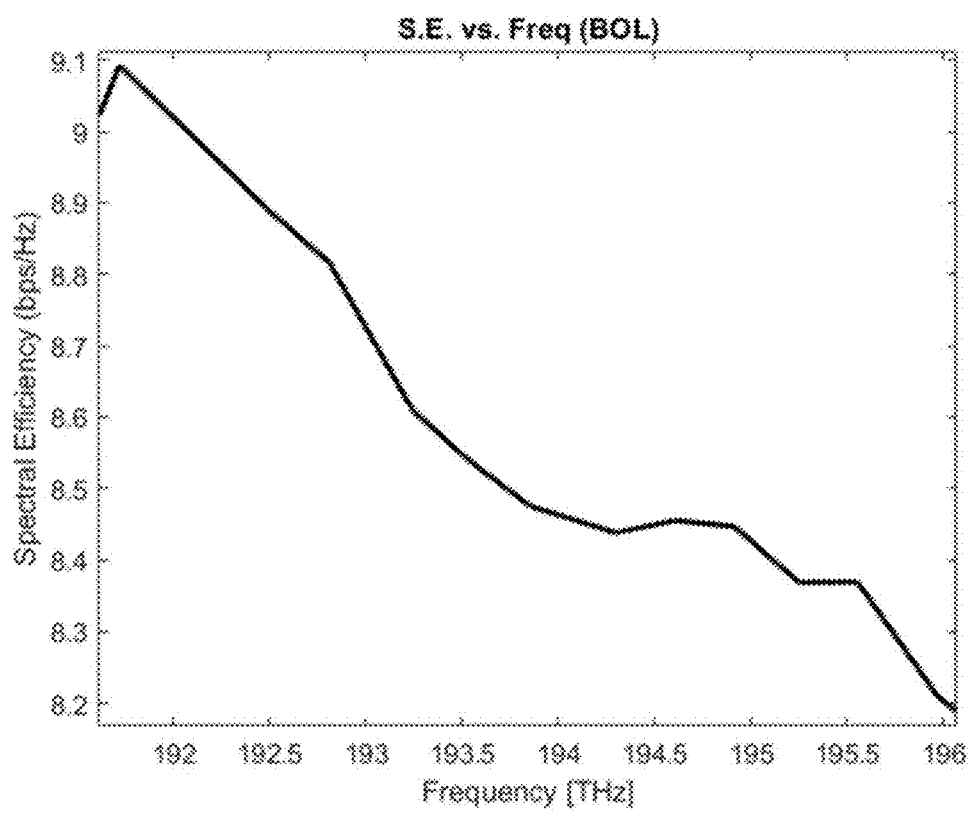
FIG. 7 is a graph of BOL Shannon spectral efficiency (S.E., in b/s/Hz) vs. frequency.
Figure 8:
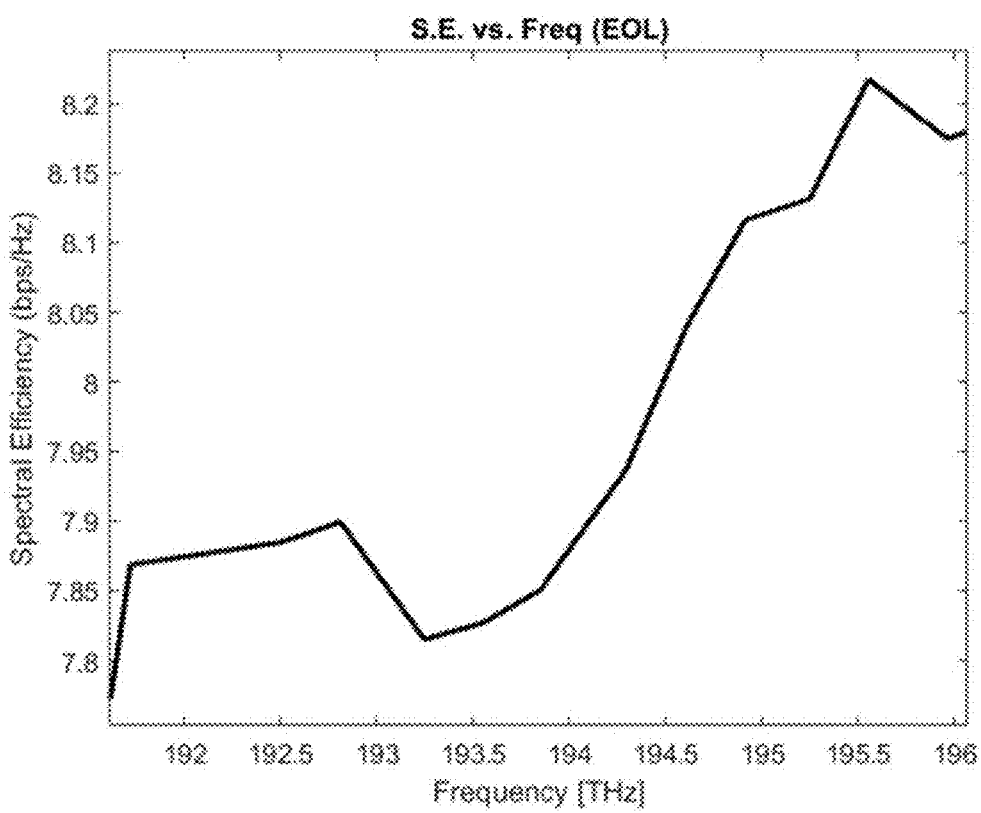
FIG. 8 is a graph of EOL Shannon spectral efficiency (S.E., in b/s/Hz) vs. frequency.

This is shown in FIG. 7 and FIG. 8 for BOL and EOL conditions respectively.

Given either of these GSNR(f) plots, how might we divide the spectrum among N different parties? There are multiple options for optimization criteria in this situation including: bandwidth, BOL capacity, EOL capacity, and change in capacity from BOL to EOL.

With each criterion, one could also choose whether the assets be distributed equally among all parties (presumably for equal value), or whether the spectral allocation be biased based on commercial negotiations with the various parties.

Once optimization criteria are agreed upon, both the spectrum buyer and seller can work towards defining a mutually agreeable spectral allocation. As an example, we will look at splitting the spectrum into sections with equal capacity.

Equal Capacity Examples

Figure 10:
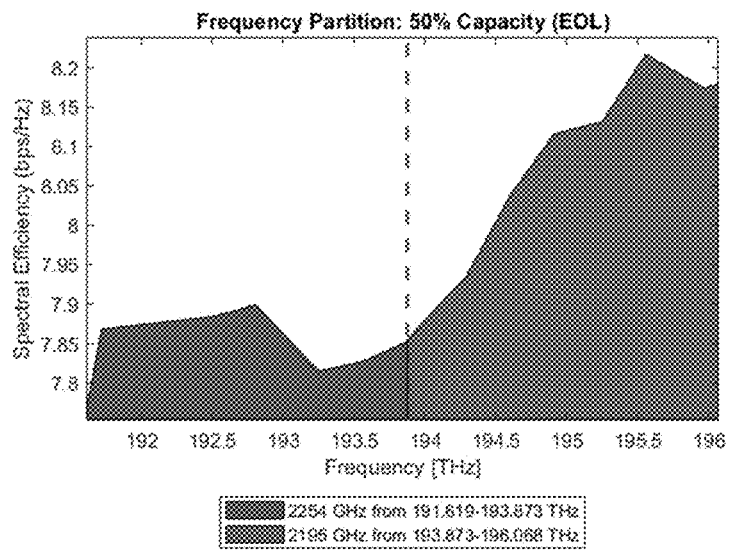
FIG. 10 is graphs of Equal Shannon capacity distribution at EOL for 2, 3, and 4 spectral partitions.
Figure 10:
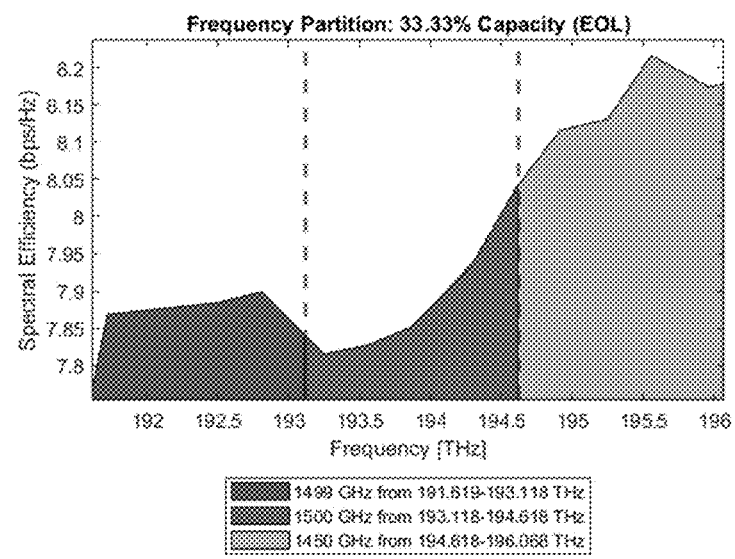
Figure 10:
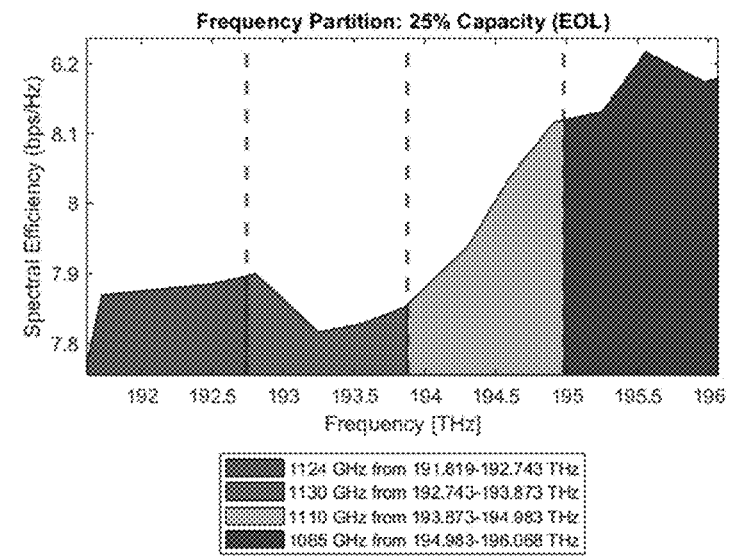

Of note, the optical performance profile across the optical spectrum is non-uniform, particularly in submarine applications. Thus, contiguous partitions cannot be intuitively defined by dividing the spectrum into N partners. Similarly, fragmented partitions require selective decisions for each partner to ensure equality in network capacity. The situation is further complicated by line system aging and repairs. For example, FIGS. 9 and 10 show how the division of the passband evolves from the beginning of life (BOL) to the end of life (EOL). Performance was originally (at BOL) highest in the red band and after aging, performance has degraded across the entire band but the blue band now holds higher spectral efficiency than the red.

The following series of plots in FIGS. 9 and 10 show illustrate how the BOL and EOL systems defined by the GSNR(f) curves above could be split into multiple sections with equal Shannon capacity. In this example, we assume that all the spectrum is accessible (no filter dead bands) and we can optimize the spectral efficiency with 1 GHz granularity (one of the benefits assuming an ideal Shannon modem).

The legend of each plot details the spectral boundaries required to equalize the capacities in each case. From these values, we can see that the difference in spectrum required to equalize Shannon capacity at a given point in time varies by up to 7.2% at BOL, and only 3.4% at EOL (due to a narrower range of GSNRs at EOL).

Figure 11:
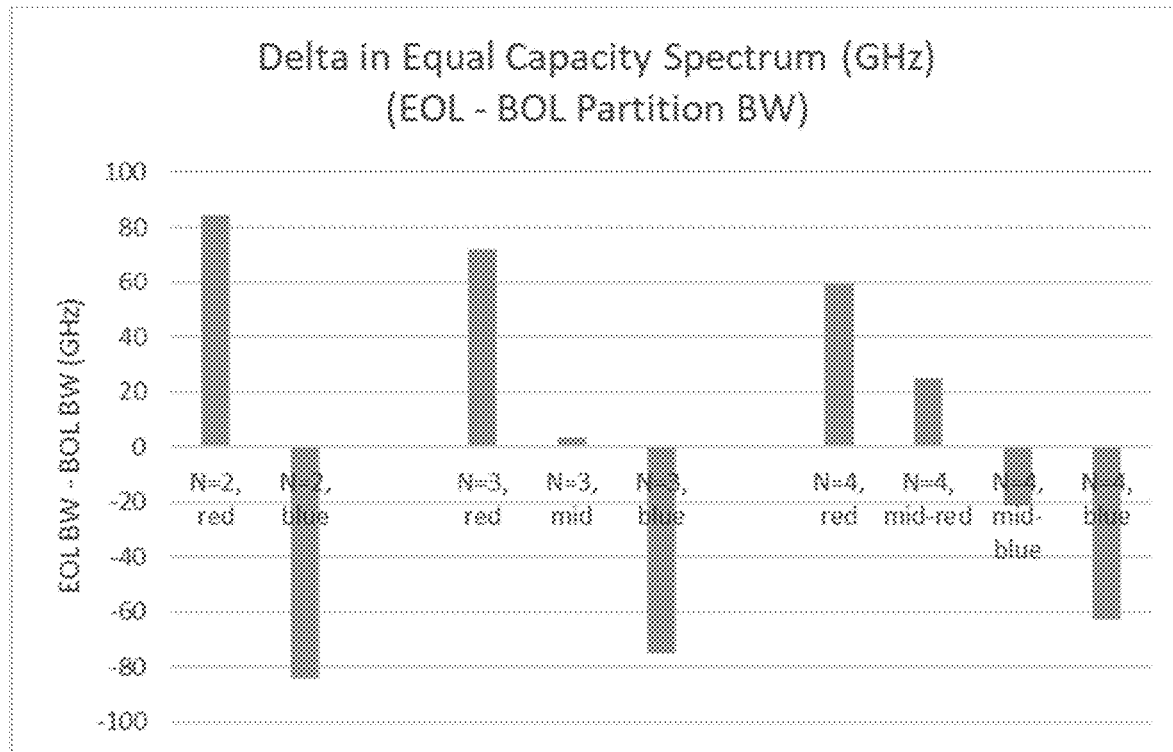
FIG. 11 is a graph of Variation in bandwidth (BW) required for equal Shannon capacity between EOL and BOL, for N=2, 3, 4 frequency partitions.

If instead one looks at how such equal-capacity-partitions vary between BOL and EOL, we get the variations shown in FIG. 11. Here we can see that the red has the largest increase in required spectrum between BOL and EOL conditions, while the blue has the largest decrease, and the mid-band sees the smallest variations overall. This is consistent with a spectrum which primarily tilts between BOL and EOL.

This illustrates another dimension in which spectrum is not equal—the relative change in SNR (and thus capacity and value) over time. While we cannot know the future with certainty, the physics of cable aging typically result in additional loss which then results in a tilt which decreases the SNR more for low frequencies. Such variations can be mitigated through the deployment of repair repeaters, but the main point is that such variations need to be planned for when negotiating the value of a given piece of spectrum.

Value Assignment Process

Figure 12:
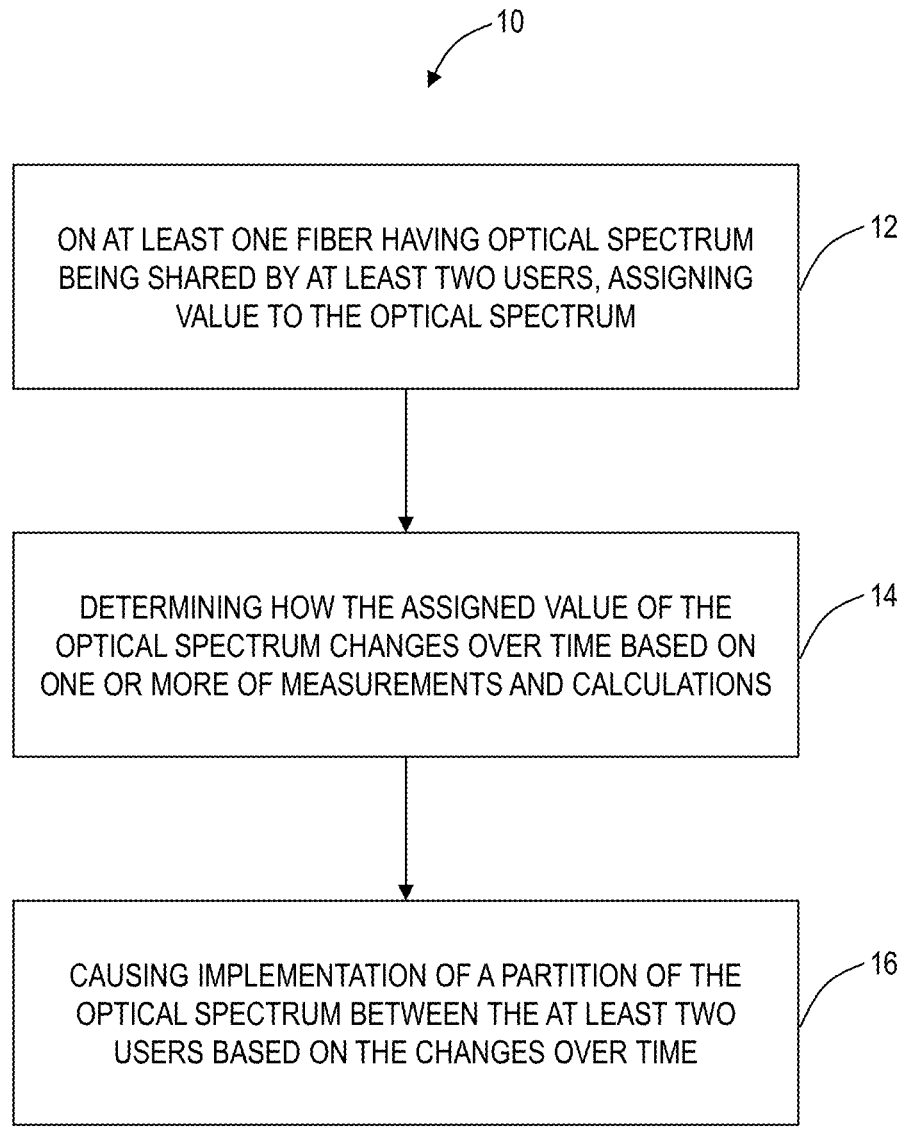
FIG. 12 is a flowchart of a process of assigning value to spectrum in a spectrum sharing environment based on a policy and implementing the spectrum sharing environment via partitioning the spectrum.

FIG. 12 is a flowchart of a process 10 of assigning value to spectrum in a spectrum sharing environment based on a policy and implementing the spectrum sharing environment via partitioning the spectrum. The process 10 contemplates implementation as a method having steps, via a processing device configured to implement the steps, and via instructions stored in a non-transitory computer-readable medium where the instructions, when executed, cause one or more processors to implement the steps. The process 10 determines spectrum values in terms of equity given criteria and ongoing operational values. Equity does not necessarily mean 50-50, but can be anything agreed to up front (BOL) that might change up through (EOL). In an embodiment, fixed sharing values can be determined for the entire life-cycle. In another embodiment, the sharing values can change over time given operational considerations. The present disclosure contemplates any commercial or contractual arrangement between the users, and is focused on the value of this arrangement over time given the dynamic nature of optical fiber. Once the spectrum values are determined, they can be provisioned (manually or automatically) in spectrum partitioning devices, e.g., WSSs, etc., as well as in modems, transceivers, SLTE terminals, etc.

The process 10 includes, on at least one fiber having optical spectrum being shared by at least two users, assigning value to the optical spectrum (step 12); determining how the assigned value of the optical spectrum changes over time based on one or more of measurements and calculations (step 14); and causing implementation of a partition of the optical spectrum between the at least two users based on the changes over time (step 16).

The process can be implemented with respect to any optical line system, including submarine, terrestrial, etc.

Spectral Allocation Considerations

Given that different parts of the spectrum are likely to experience different changes, and some parts of the spectrum could improve while other parts degrade, how can this be mitigated in a spectrum sharing solution?

There are two broad categories of spectral allocation between N parties in a shared spectrum system: contiguous and fragmented. In the contiguous case, all the spectrum assigned to one user is in one continuous frequency range. This is the easiest to visualize and is what was assumed in the examples in the previous section. This approach also minimizes the amount of spectrum wasted due to the filter dead-bands (Filter dead-bands are required whenever a WSS is used to switch between ports, i.e., between spectral sections which are assigned to different users), thus maximizing the total capacity of the fiber pair. However, this approach also necessarily means that different users are constrained to different parts of the band, and this can lead to inequalities in terms of SNR variations.

In the fragmented case, each user is assigned some spectrum from each different spectral region (e.g., blue, mid, and red), resulting in multiple frequency regions per user. This approach can minimize the differences in spectral behavior between users but comes at a cost of lower overall spectral efficiency due to the additional filter dead-bands.

In either case, users should also consider how to budget for transient events which may be caused by other users making changes to their own spectral content. Ideally, such transients will be mitigated through well-defined rules around each user's ability to manipulate spectrum, and through spectrum sharing features such as policing. However, even though a shared fiber pair may be treated as N independent virtual fiber pairs from a commercial point of view, it is still a single shared analog medium.

An example of policing is described in U.S. Pat. No. 9,853,762, entitled "Automated provisioning and control of shared optical spectrum in submarine optical networks," issued Dec. 26, 2017, the contents of which are incorporated by reference in their entirety.

Impact of Terminal Technologies

We have discussed how to value spectrum independent of SLTE technology using an upper bound defined with the Shannon-Hartley capacity formula. However, one must consider the specific terminal technology planned for a given deployment when calculating the actual capacity expected from a given spectrum sharing application.

SLTE Photonics

Regarding SLTE photonics, the ability to operate on a truly flexible grid is a key attribute. While a commercial agreement may choose to set frequency boundaries on a well-defined grid (e.g., 50 GHz ITU grid), the boundaries calculated for a given optimization criteria are unlikely to land on such frequencies. Thus, having a flexible grid terminal is required to access all available spectrum and maximize the value of each user's share. A second key photonic attribute is minimizing spectral waste. This applies to both the filter dead-bands required by the WSS technology and to the Mux/Demux structures chosen.

SLTE Modems

SLTE modem technology also plays a key role in spectrum sharing applications. For example, current commercial, deployable solutions will not achieve the upper bound defined by the Shannon Capacity. The achievable capacity will be impacted not only by modem performance (modem noise and implementation), but also by quantization of performance due to discrete client rate and/or baud options.

With variations in spectral performance (and possibly spectral allocation) over time, it is valuable to have a modem which can adapt to your changing needs and provide an optimized solution throughout the life cycle of your shared spectrum application. This makes flexible baud and flexible client rates key features for optimizing modem performance. These allow a user to optimize the net capacity across their spectrum and not be constrained to potentially wasteful fixed channel spacings.

Not only will the modem's performance and flexibility impact the achievable capacity for a given application, but instrumentation, and automation are also key attributes in a shared spectrum environment (see D. Boertjes, "Perspectives and Challenges on the Next Generation of Autonomous Networks," OSA Technical Digest (Optica Publishing Group, 2020), paper NeM2B.1).

SLTE Automation

One might have an excellent plan for spectrum sharing on a given cable system, but instrumentation and automation are key to successful execution. Modem instrumentation is critical for characterizing in situ cable performance, and SLTE automation is required to obtain this characterization in an efficient and timely manner.

Specifically, accurate and efficient measurements of GSNR vs. frequency enable a clear and objective valuation of a shared spectrum solution. This is important at all stages after deployment including cable acceptance, after major cable events/repairs, and during changes in spectral ownership.

Once measured data is acquired, automated analysis can help define the spectral boundaries and Shannon Capacities based on the chose optimization criteria.

Example Optical Line System

Figure 13:
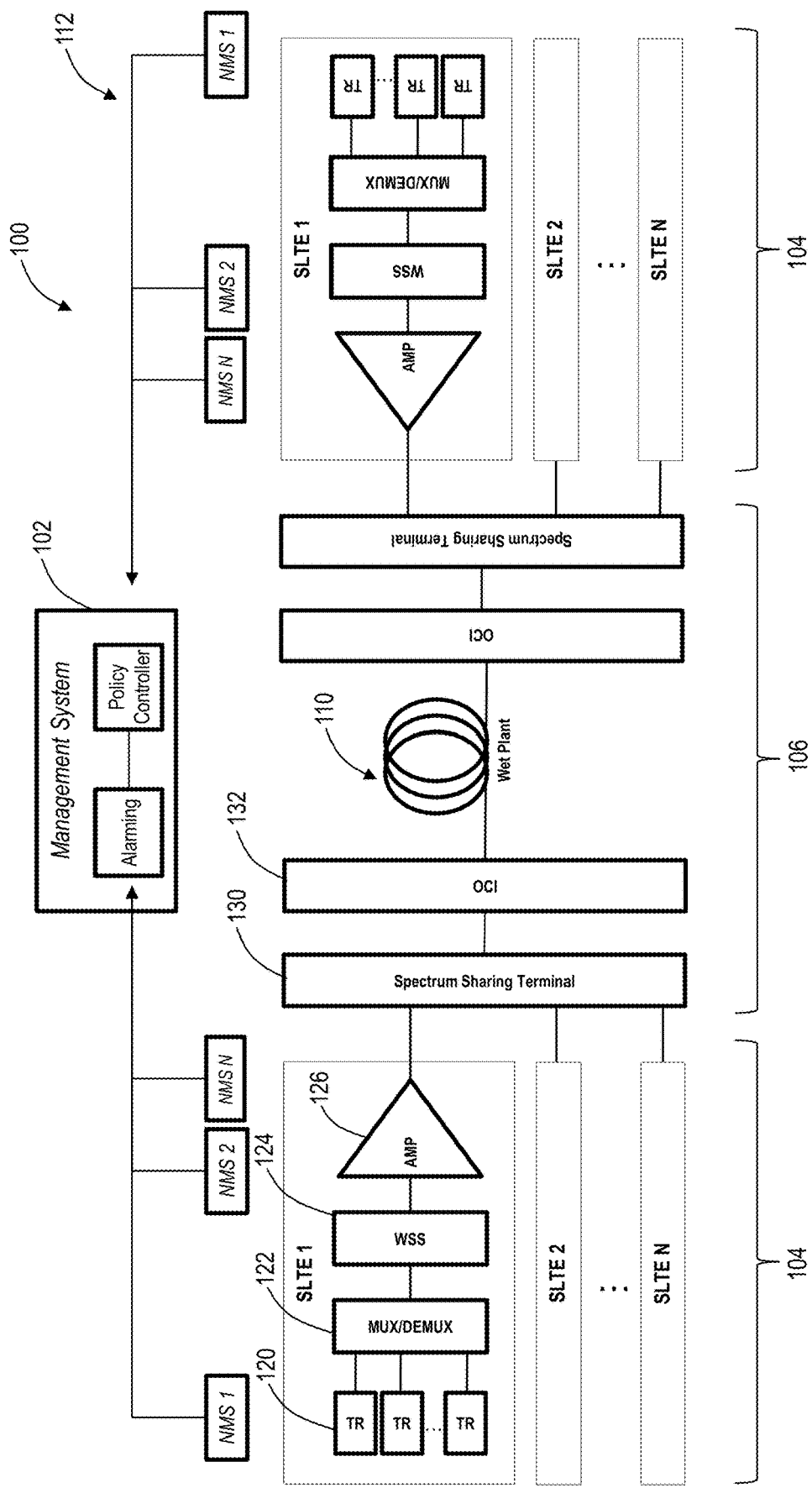
FIG. 13 is a network diagram of an optical line system including a management system, terminal equipment, and a line system.
Figure 14:
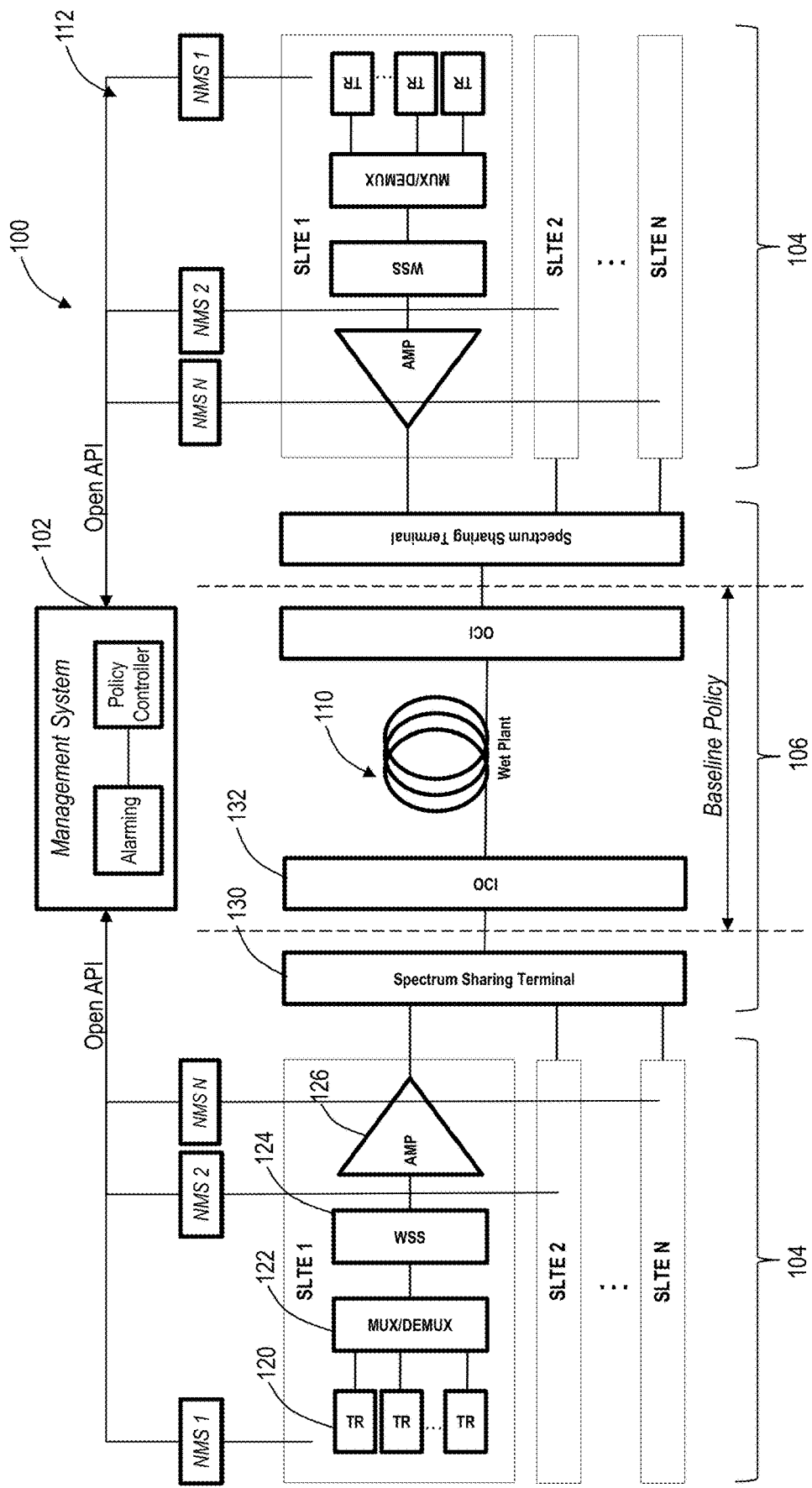
FIG. 14 is a network diagram of the optical line system illustrating connectivity between the management system and the terminal equipment for monitoring policy.
Figure 15:
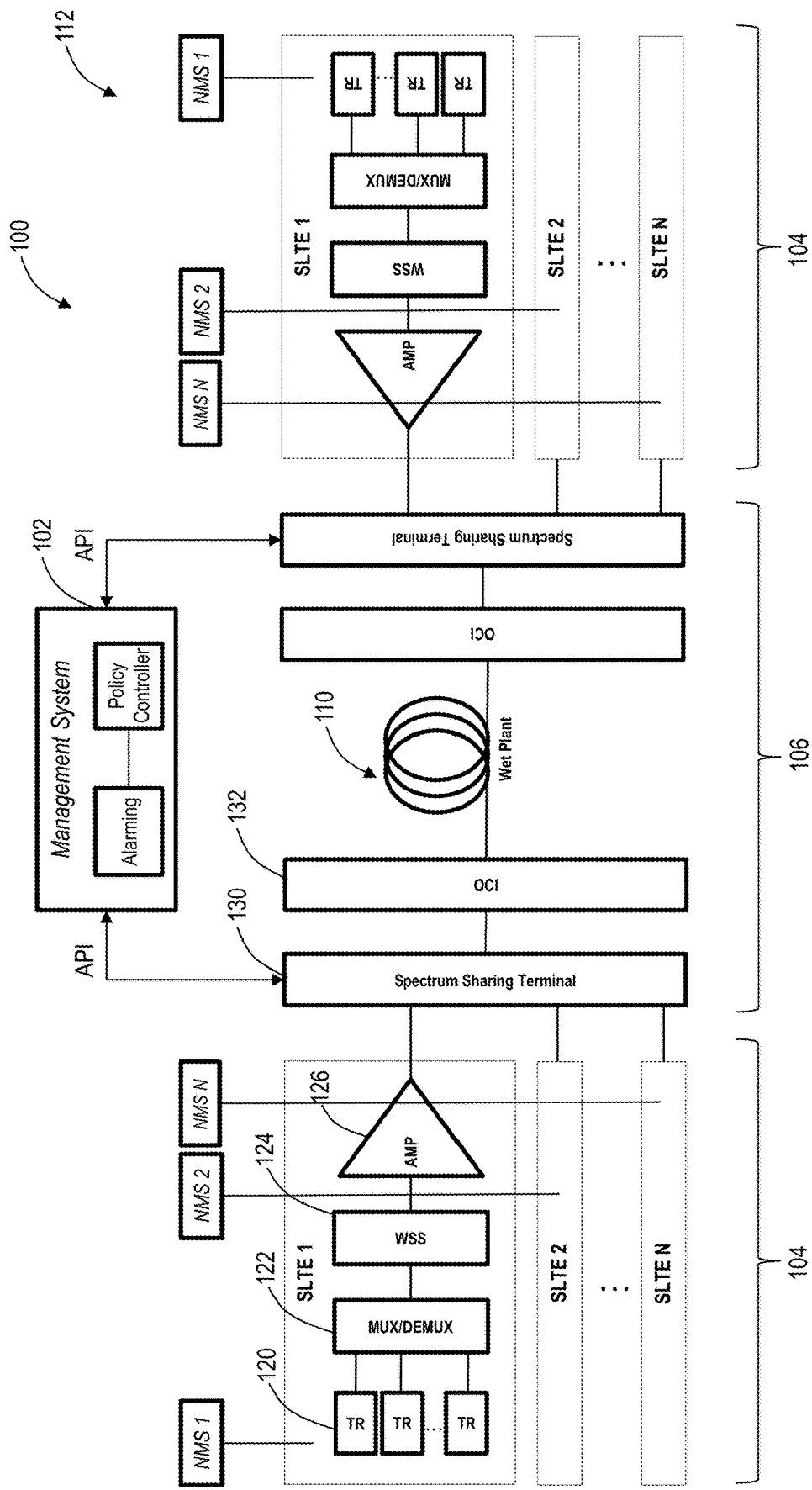
FIG. 15 is a network diagram of the optical line system illustrating connectivity between the management system and the line system for enforcement, i.e., partitioning.

FIG. 13 is a network diagram of an optical line system 100 including a management system 102, terminal equipment 104, and a line system 106. FIG. 14 is a network diagram of the optical line system 100 illustrating connectivity between the management system 102 and the terminal equipment 104 for monitoring policy. FIG. 15 is a network diagram of the optical line system 100 illustrating connectivity between the management system 102 and the line system 106 for enforcement, i.e., partitioning. For illustration purposes, the optical line system 100 is illustrated as a submarine system where the terminal equipment 104 is located at a cable landing or the like, and the line system 106 includes wet plant 110 with a cable and various repeaters (i.e., optical amplifiers) and the like (omitted for illustration purposes). Those skilled in the art will recognize the submarine system is just one example where spectrum sharing is possible. We also contemplate terrestrial systems where the line system 106 is disaggregated from the terminal equipment, as well as other optical line systems. For example, the terminal equipment 104 in a submarine system is referred to as SLTE equipment, and those skilled in the art will recognize the terrestrial equivalent is referred to as an Optical Add/Drop Multiplexer (OADM), Reconfigurable OADM (ROADM), Wavelength Division Multiplexing (WDM) terminal, and the like. Conversely, the line system 106 in a terrestrial system may simply be referred to as the line side having amplifiers and the like, instead of "wet plant" in a submarine system.

Those skilled in the art will recognize the management system 102, the terminal equipment 104, and the line system 106 each contemplate various components for realizing the same functionality whether in a submarine system, terrestrial system, or the like. Generally, the management system 102 is a computing system, implemented via one or more servers, clusters, etc. as well as in a cloud. The management system 102 is focused on monitoring operation, performing configuration of various components, as well as general Operations, Administration, Maintenance, and Provisioning (OAM&P) functions. The management system 102 may operate as a high-level controller, interacting with Network Management Systems (NMS) 112 associated with the terminal equipment 104 and the line system 106. For example, the terminal equipment 104 and the line system 106 may include equipment from different vendors, thus having different management systems. Also, due to the spectrum sharing, it is often likely the terminal equipment 104 can be from different vendors as well. In a typical deployment, the management system 102 implementing the spectrum sharing partitioning, deployment, monitoring, and enforcement can communicate with various different NMSs and the like, via northbound interfaces, open Application Programming Interfaces (APIs) and the like.

The terminal equipment 104 is configured to perform optical-electrical-optical (OEO) conversion, multiplexing/demultiplexing, and amplification. The terminal equipment 104 includes transceivers (TR) 120 which are also referred to as transmitters/receivers, modems, coherent modems, pluggable optical modules, transponders, and the like. Each transceiver 120 can be multiplexed/demultiplexed via a mux/demux 122 and a Wavelength Selective Switch (WSS)

124, and finally amplified via an optical amplifier 126 before connecting to the line equipment 106. Those skilled in the art will recognize there can be various multiplexing/demultiplexing approaches. For example, the mux/demux 122 can combined multiple channels from multiple TRs 120 to a subset of spectrum, e.g., creating a media channel (MC). The WSS 124 can combine multiple subsets of spectrum, and the like. In this example, there are N SLTE components, namely SLTE 1, SLTE 2, . . . , SLTE N, (N is a positive integer). Here, there are N users (i.e., service providers) sharing the spectrum over the line system 106. The objective of the terminal equipment 104 is to provide channels in the assigned, allotted, or partitioned spectrum on the line system 106.

The line system 106 includes a Spectrum Sharing Terminal 130 and an Open Cable Interface (OCI) 132 to the wet plant 110. The Spectrum Sharing Terminal 130 can be implemented as a WSS as well as other optical components and its function is to enforce the assigned, allotted, or partitioned spectrum on the line system 106, for each user, i.e., SLTE 1-SLTE N. Again, one implementation of the Spectrum Sharing Terminal 130 is described in U.S. Pat. No. 9,853,762, entitled "Automated provisioning and control of shared optical spectrum in submarine optical networks," issued Dec. 26, 2017, the contents of which are incorporated by reference in their entirety.

Optimization of Spectrum Sharing in Optical Line Systems

The process 10 described herein utilizes the approaches of assigning value to optical spectrum to partition the optical spectrum based on a policy. This process 10 contemplates implementation at a point in time, such as initial deployment, after operation for a time with changed conditions, and the like. We propose to utilize the assigned value throughout the entire lifecycle and deployment of the optical line system 100. That is, the following describes the optical line system 100 from initial engineering and planning, to deployment, to operation over time, and the like. The objective is to ensure the assigned spectrum (partitioned spectrum) is equitable based on the policy.

Figure 16:
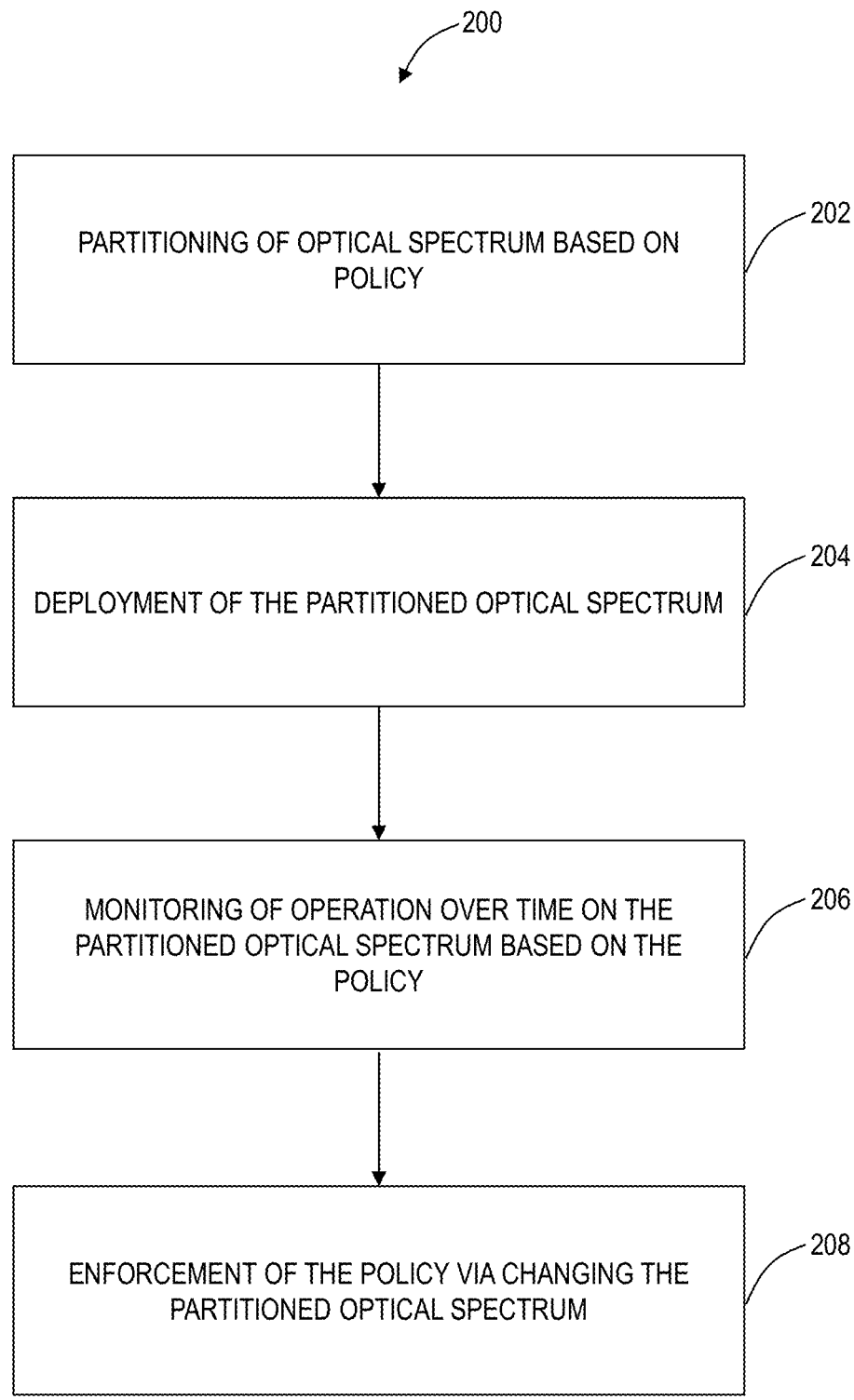
FIG. 16 is a flowchart of a process for utilizing spectrum value assignment to partition, deploy, monitor, and enforce policy in shared optical spectrum.

FIG. 16 is a flowchart of a process 200 for utilizing spectrum value assignment to partition, deploy, monitor, and enforce policy in shared optical spectrum. The process 200 contemplates implementation as a method having steps, via a processing device configured to implement the steps, and via instructions stored in a non-transitory computer-readable medium where the instructions, when executed, cause one or more processors to implement the steps. In particular, the process 200 is described from the perspective of the management system 102 communicating with the optical line system 100, although other implementations are contemplated.

The objective of the process 200 is to partition optical spectrum amongst N users, whether contiguous and/or fragmented, according to a predefined policy (step 202). Partitioning means the spectrum is broken up so that each of the N users has some assigned value. The values can be equal as well as non-equal. The key is they are agreed upon up front. The partitioning can be contiguous (e.g., FIG. 1) and/or fragmented (e.g., FIG. 2). The objective of the partitioning step 202 is to assign the spectrum as a function of optical or transceiver performance monitored through the management system 102. The unique frequency divisions and/or frequency groups are specified based on the optical performance profile across the band against the policy. Of note, the partitioning conventionally is a static step, performed once at the planning and engineering of the optical line system 100. The present disclosure contemplates this partitioning step 202 to become dynamic, reevaluated over time for dynamic partitioning based on lifetime monitoring, by the management system 102. Based on this monitoring, the partitioning step 202 contemplates reevaluation where equitable partner requirements are achieved through actively expanding and/or compressing frequency partitions and/or frequency allocations over time. As described herein, frequency partitions and/or frequency allocations are the same as the partitioning of the optical spectrum.

Figure 17:
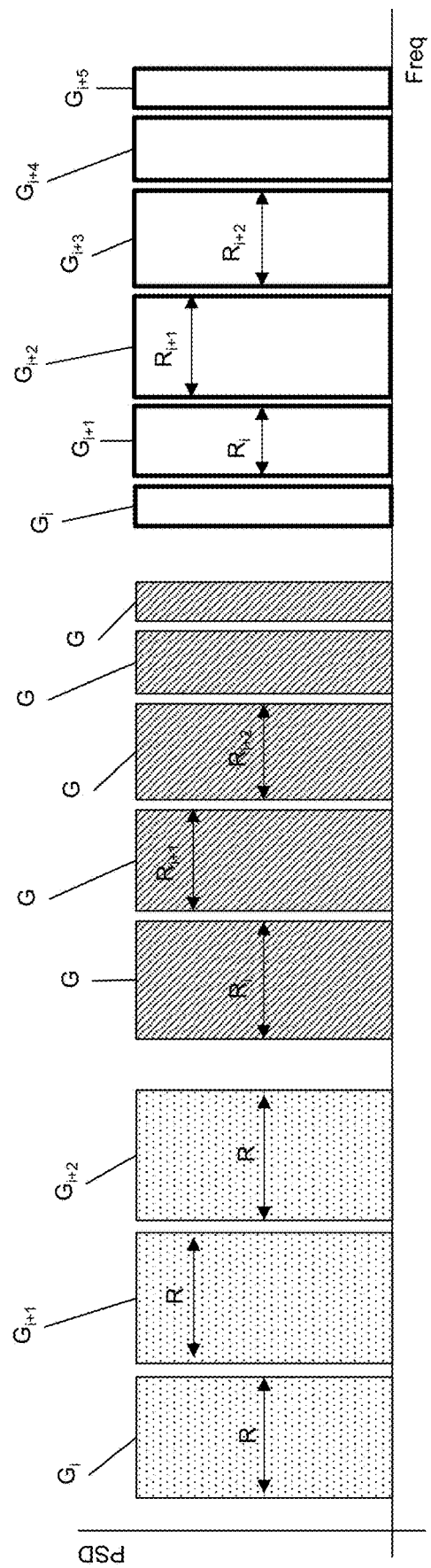
FIG. 17 is a graph of optical spectrum for illustrating deployment of a policy where the various rules are used to allocate the spectrum.

Once the spectrum is partitioned, the process 200 includes deployment of the partitioned optical spectrum (step 204). The deployment step 204 includes configuration of the terminal equipment 104 and/or the line system 106. For example, the deployment step 204 can include configuration of the Spectrum Sharing Terminal 130. In an embodiment, the deployment step 204 can include allocation of spectral bands in the line system 206 for the N users such that each band equally fits the highest baud (R) channel at arbitrary line rates (G) defined or undefined by the occupying partner. In another embodiment, the allocation of spectral bands in the line system 206 for the N users such that each band equally fits the same channel count of line rates (G). In a further embodiment, the allocation of spectral bands in the line system 206 for the N users is performed to equally contain the same maximum theoretical capacity based on continuous or discretized integration of the frequency-dependent optical performance. Of course, any combination or superposition of the above approaches can be used in the deployment step 204. For example, FIG. 17 is a graph of optical spectrum for illustrating deployment of a policy where the various rules are used to allocate the spectrum.

After the deployment step 204, the process 200 includes monitoring of operation over time on the partitioned optical spectrum based on the policy (step 206). The management system 102 can build and store any optical knowledge with the end-to-end performance monitors (PMs) of current traffic or non-traffic carrying channels. This data can be obtained during the calibration phase of turnup, during field trials, or pre-deployment activities, all associated with the optical line system 100. In an embodiment, open interfaces are used to capture Performance Monitoring (PM) data post-deployment and/or commissioning. Open interfaces are standardized. The management system 102 can provide the database of PMs to a spectrum sharing policy controller, which can be part of the management system 102 or implemented separately.

Following the monitoring step 206, the process 200 includes enforcement of the policy via changing the partitioned optical spectrum (step 208). This can include reimplementing the partitioning step 202. The objective is to perform some adjustment of the allocated spectrum when there are changes that make the policy no longer equitable. The enforcement step 208 can include pushing system level changes over Open APIs to partner network management systems (NMS) based on the partitioning, deployment, and monitoring policy steps. Here, the objective is to trigger spectral boundary or partition expansion and/or compression based on performance degradation or system enhancements.

The process 200 contemplates operation of the monitoring step 206 and the enforcement step 208 dynamically over system lifetime or instantaneous changes, to allow the active redistribution of spectral allocations on new partner adds and/or partner deletes. The partitioning step 202 and the deployment step 204 contemplate operation at system planning, engineering, installation, and turnup. The monitoring step 206 and the enforcement step 208 can be performed periodically, based on system changes, and the like. Also, the enforcement step 208 can be configured to only change configuration once threshold changes are met.

Process for Partitioning Optical Spectrum Based on Value

Figure 18:
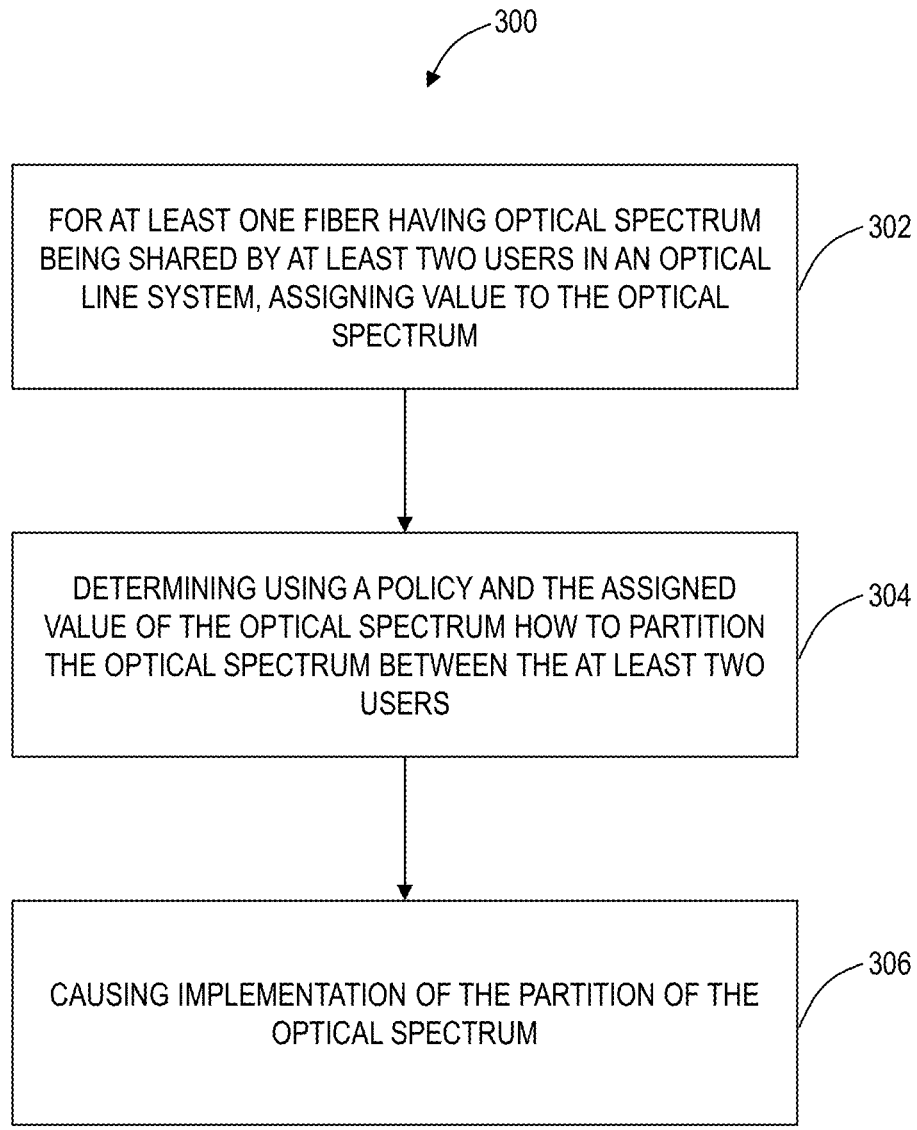
FIG. 18 is a flowchart of a process for partitioning optical spectrum based on value.

FIG. 18 is a flowchart of a process 300 for partitioning optical spectrum based on value. The process 300 contemplates implementation as a method having steps, via a processing device configured to implement the steps, and via instructions stored in a non-transitory computer-readable medium where the instructions, when executed, cause one or more processors to implement the steps. In particular, the process 300 is described from the perspective of the management system 102 communicating with the optical line system 100, although other implementations are contemplated. Further, the process 300 is described from the perspective of a single point in time, namely to show how to use the assigned value at any given point in time to equitably partition the optical spectrum based on the policy. Equitably means to partition the optical spectrum based on the agreed upon policy. As noted herein, the value of spectrum can change over time due to a variety of factors.

The process 300 includes, for at least one fiber having optical spectrum being shared by at least two users in an optical line system, assigning value to the optical spectrum (step 302); determining using a policy and the assigned value of the optical spectrum how to partition the optical spectrum between the at least two users (step 304); and causing implementation of the partition of the optical spectrum (step 306). As described herein, the policy is something agreed on by the at least two users. For example, the at least two users can be equal partners, each getting the same amount of bandwidth. Other approaches are contemplated.

The assigned value of the optical spectrum is based on information carrying capacity in bandwidth per second. The assigned value of the optical spectrum accounts for performance versus frequency, such that two or more of the at least two users have different amounts of the optical spectrum from one another. As such, the assigned value is a more accurate representation than an equal split of the optical spectrum.

In an embodiment, the partition of the optical spectrum is contiguous such that each of the at least two users has a contiguous amount of the optical spectrum. In another embodiment, the partition of the optical spectrum is fragmented between each of the at least two users. In a further embodiment, the partition can be a combination of contiguous and fragmented.

In an embodiment, the determining and the implementation is performed at system turnup of the optical line system. In another embodiment, the determining and the implementation is performed subsequent to system turnup and after a period of operation of the optical line system, where there has been any of performance degradation of the optical line system and system enhancement of the optical line system.

The process 300 can further include monitoring the optical line system; and checking the partition of the optical spectrum with the policy to determine whether there is violation of the policy due to any of performance degradation of the optical line system and system enhancement of the optical line system.

The policy can include one of allocation of spectral bands for the at least two users such that each band equally fits a highest baud channel at an arbitrary line rate, allocation of the spectral bands for the at least two users such that each band equally fits a same channel count of line rates, and allocation of the spectral bands for the at least two users that equally contain a same maximum theoretical capacity based on integration of frequency-dependent optical performance.

In another embodiment, a management system 102 includes a network interface connected to terminal equipment from at least two users and a line system, the terminal equipment from the at least two users and the line system forming an optical line system; one or more processors communicatively coupled to the network interface; and memory storing instructions that, when executed, cause the one or more processors to implement the process 300. The implementation is caused by configuring any of the terminal equipment from the at least two users and the line system.

CONCLUSION

We have proposed a means of assigning value to spectrum in a spectrum sharing environment using Shannon Capacity and explored how variations in SNR over frequency and time impact such valuations. We used a representative spectrum to illustrate spectrum allocation between users using equal capacity. Also, we discussed the roles of terminal technologies and automation in spectrum sharing applications. Finally, we described how the use of the assigned value by a management system 102 can be used to partition, deploy, monitor, and deploy an optical line system 100 with the spectrum partitioned based on policy.

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A non-transitory computer-readable medium comprising instructions that, when executed, cause one or more processors to perform steps of:
   for at least one fiber having optical spectrum being shared by at least two users in an optical line system, assigning value to the optical spectrum using spectral efficiency of the optical spectrum, wherein the assigned value is dependent on Generalized Signal to Noise Ratio (GSNR) and varies over time as performance of the optical spectrum changes over time;
   determining using a policy and the assigned value of the optical spectrum how to partition the optical spectrum between the at least two users, wherein the assigned value is a metric used to determine the partition based on the policy; and
   causing implementation of the partition of the optical spectrum.

2. The non-transitory computer-readable medium of claim 1, wherein the assigned value of the optical spectrum is based on information carrying capacity in bandwidth per second.

3. The non-transitory computer-readable medium of claim 1, wherein the assigned value of the optical spectrum accounts for performance versus frequency, such that two or more of the at least two users have different amounts of the optical spectrum from one another.

4. The non-transitory computer-readable medium of claim 1, wherein the partition of the optical spectrum is contiguous such that each of the at least two users has a contiguous amount of the optical spectrum.

5. The non-transitory computer-readable medium of claim 1, wherein the partition of the optical spectrum is fragmented between each of the at least two users.

6. The non-transitory computer-readable medium of claim 1, wherein the determining and the implementation is performed at system turnup of the optical line system.

7. The non-transitory computer-readable medium of claim 1, wherein the determining and the implementation is performed subsequent to system turnup and after a period of operation of the optical line system, where there has been any of performance degradation of the optical line system and system enhancement of the optical line system.

8. The non-transitory computer-readable medium of claim 1, wherein the steps further include
   monitoring the optical line system; and
   checking the partition of the optical spectrum with the policy to determine whether there is violation of the policy due to any of performance degradation of the optical line system and system enhancement of the optical line system.

9. The non-transitory computer-readable medium of claim 1, wherein the policy includes one of
   allocation of spectral bands for the at least two users such that each band equally fits a highest baud channel at an arbitrary line rate,
   allocation of the spectral bands for the at least two users such that each band equally fits a same channel count of line rates, and
   allocation of the spectral bands for the at least two users that equally contain a same maximum theoretical capacity based on integration of frequency-dependent optical performance.

10. The non-transitory computer-readable medium of claim 1, wherein the partition of the optical spectrum is fragmented between each of the at least two users.

11. A method comprising steps of:
    for at least one fiber having optical spectrum being shared by at least two users in an optical line system, assigning value to the optical spectrum using spectral efficiency of the optical spectrum, wherein the assigned value is dependent on Generalized Signal to Noise Ratio (GSNR) and varies over time as performance of the optical spectrum changes over time;
    determining using a policy and the assigned value of the optical spectrum how to partition the optical spectrum between the at least two users, wherein the assigned value is a metric used to determine the partition based on the policy; and
    causing implementation of the partition of the optical spectrum.

12. The method of claim 11, wherein the assigned value of the optical spectrum is based on information carrying capacity in bandwidth per second.

13. The method of claim 11, wherein the assigned value of the optical spectrum accounts for performance versus frequency, such that two or more of the at least two users have different amounts of the optical spectrum from one another.

14. The method of claim 11, wherein the partition of the optical spectrum is contiguous such that each of the at least two users has a contiguous amount of the optical spectrum.

15. The method of claim 11, wherein the determining and the implementation is performed at system turnup of the optical line system.

16. The method of claim 11, wherein the determining and the implementation is performed subsequent to system turnup and after a period of operation of the optical line system, where there has been any of performance degradation of the optical line system and system enhancement of the optical line system.

17. The method of claim 11, wherein the steps further include
    monitoring the optical line system; and
    checking the partition of the optical spectrum with the policy to determine whether there is violation of the policy due to any of performance degradation of the optical line system and system enhancement of the optical line system.

18. The method of claim 11, wherein the policy includes one of
    allocation of spectral bands for the at least two users such that each band equally fits a highest baud channel at an arbitrary line rate,
    allocation of the spectral bands for the at least two users such that each band equally fits a same channel count of line rates, and allocation of the spectral bands for the at least two users that equally contain a same maximum theoretical capacity based on integration of frequency-dependent optical performance.

19. A management system comprising:
a network interface connected to terminal equipment from at least two users and a line system, the terminal equipment from the at least two users and the line system forming an optical line system;
one or more processors communicatively coupled to the network interface; and
memory storing instructions that, when executed, cause the one or more processors to
for at least one fiber having optical spectrum being shared by the at least two users in the optical line system, assign value to the optical spectrum using spectral efficiency of the optical spectrum, wherein the assigned value is dependent on Generalized Signal to Noise Ratio (GSNR) and varies over time as performance of the optical spectrum changes over time,
determine using a policy and the assigned value of the optical spectrum how to partition the optical spectrum between the at least two users, wherein the assigned value is a metric used to determine the partition based on the policy, and
cause implementation of the partition of the optical spectrum.

20. The management system of claim 19, wherein the implementation is caused by configuring any of the terminal equipment from the at least two users and the line system.

* * * * *